United States Patent [19]
Mweene

[11] Patent Number: 5,936,853
[45] Date of Patent: Aug. 10, 1999

[54] POWER CONVERTER HAVING A LOW-LOSS CLAMP AND METHOD OF OPERATION THEREOF

[75] Inventor: Loveday H. Mweene, Mesquite, Tex.

[73] Assignee: Lucent Technologies Inc., Murray Hill, N.J.

[21] Appl. No.: 09/036,538

[22] Filed: Mar. 6, 1998

[51] Int. Cl.[6] ................................................ H02M 1/14
[52] U.S. Cl. .............................................................. 363/44
[58] Field of Search ................................. 363/44, 45, 46, 363/47, 48

[56] References Cited

U.S. PATENT DOCUMENTS

| | | | |
|---|---|---|---|
| 2,377,180 | 5/1945 | Pohm | 363/44 |
| 3,663,940 | 5/1972 | Schwarz | 363/45 |
| 3,777,248 | 12/1973 | Vermolen | 363/45 |
| 3,916,286 | 10/1975 | Waehner | 363/45 |
| 4,488,211 | 12/1984 | Miyoiri | 363/45 |

OTHER PUBLICATIONS

Sabaté, J.A., Vlatkovic, V., Ridley, R.B., and Lee, F.C.; *High–Voltage, High–Power, ZVS, Full–Bridge PWM Converter Employing an Active Snubber; IEEE*, Jun., 1991; pp. 158 through 163.

Redl, Richard, Sokal, Nathon O., Balogh, Laszlo; *A Novel Soft–Switching Full–Bridge DC.DC Converter: Analysis, Design Considerations, and Experimental Results at 1.5 kW, 100 kHz; IEEE*, Aug., 1990; pp. 162 through 172.

Harada, Koosuke and Sakamoto, Hiroshi; *Switched Snubber For High Frequency Switchin; IEEE*, Aug., 1990; pp. 181 through 188.

Hua, Guichao, Lee, Fred C. and Jovanović, Milan M,; *An Improved Zero–Voltage–Switched PWM Converter Using a Saturable Inductor; IEEE*, Apr., 1991; pp. 189 through 194.

Mweene, Loveday H., Wright, Chris A., Schlecht, Martin F.; *A 1 kW, 500 kHz Front–End Converter for a Distributed Power Supply System; IEEE*, Mar., 1989, pp. 423 through 432.

*Primary Examiner*—Jeffrey Sterrett

[57] ABSTRACT

For use with a power converter having a rectifier that receives current from a secondary side of transformer and delivers the current to an output thereof via an output inductor, a low loss clamp for, and method of, attenuating ringing energy in the secondary side. In one embodiment, the clamp includes: (1) an auxiliary transformer coupled across a component in the secondary side and (2) an auxiliary switch, interposed between the auxiliary transformer and the output, that operates as a function of a voltage of the output to cause the auxiliary transformer to receive at least a portion of the ringing energy and deliver the portion to the output.

21 Claims, 4 Drawing Sheets

POWER CONVERTER HAVING A LOW-LOSS CLAMP AND METHOD OF OPERATION THEREOF

TECHNICAL FIELD OF THE INVENTION

The present invention is directed, in general, to power conversion and, more specifically, to a low-loss clamp that attenuates ringing energy in a power converter and a method of operation thereof.

BACKGROUND OF THE INVENTION

Power converters (for instance, DC/DC power converters) are used to provide alternate levels of DC voltage from a primary source of DC voltage. These converters customarily use switching devices that convert the DC input voltage into an AC voltage to drive a primary winding of a transformer thereby allowing the voltages in the secondary side of the transformer to be selected to meet the load requirements. The switching devices are usually operated at relatively high switching frequencies to allow the use of smaller components such as inductors and capacitors within the converter. As a result, the parasitic or stray inductances or capacitances associated with the components of the converter can be reduced.

The parasitic elements mentioned above, however, generate high frequency oscillations that appear as undesired "ringing" waveforms in the converter. The ringing waveforms prompt the use of higher rated and higher cost circuit components in order to operate in such an environment. Additionally, the deleterious ringing causes the converter to be lossy and less efficient. Some of the loss manifests itself as undesirable electromagnetic interference (EMI) causing regulatory problems which must be addressed. Due to the relatively small resistance values of the transformer and inductor elements, the ringing energy may only be lightly damped in the converter.

The spurious ringing necessitates that a rectifier (e.g., diodes) with higher reverse voltage ratings be employed in the converter. For example, if the ordinary reverse voltage in the converter is 200 volts and the added ringing voltage generates 400 volts, the rectifier diode must conservatively have a reverse voltage rating of about 600 volts. A 600 volt diode is more expensive and generally generates a larger conduction voltage drop than a 300 volt rated diode (which could be used if the voltage ringing did not exist). The increased forward voltage drop induces additional losses in the converter thereby effecting the overall efficiency.

Conventional ways of reducing the ringing voltage in the converter include a "snubber" circuit placed across each rectifier diode which consists of, in one example, a resistor connected in series with a capacitor. The snubber acts as a damping device to reduce the ringing amplitude by dissipating a portion of the ringing energy. While the snubber circuit reduces the reverse voltage across the rectifier diode allowing lower rated devices to be used, it also reduces the overall efficiency of the converter. More specifically, the snubber capacitor causes more current to flow through the rectifier diode when it conducts providing additional energy losses in the converter.

Another technique for reducing the ringing amplitude is to place a saturable reactor in series with the rectifier diode. The saturable reactor is a nonlinear inductor which adopts a lossy characteristic change as the current through it increases to a point where the core material saturates. The saturation characteristic effectively damps the ringing amplitude by dissipating the ringing energy (and reducing the EMI), but it tends to become physically hot and, as a result, is often impractical to use in the converter.

Other damping circuits such as active snubber circuits may also be used in a variety of schemes to reduce the ringing amplitude. Examples of active snubber circuits are illustrated and described in L. H. Mweene, et al., *A 1 kW, 500 kHz, front-end converter for a distributed power supply system,* Proc. IEEE Applied Power Electronics Conf., March 1989, pp. 423–432; R. Redl, et al., *A novel soft-switching full-bridge dc/dc converter: analysis, design considerations and experimental results at 1.5 kW, 100 kHz,* IEEE Power Electronics Specialists Conf. Rec., 1990, pp. 162–172; G. Hua, et al., *An improved zero-voltage-switched PWM converter using a saturable inductor,* IEEE Power Electronics Specialists Conf. Rec., 1991, pp. 189–194; K. Harada, et al., *Switched snubber for high frequency switching,* IEEE Power Electronics Specialists Conf., 1990, pp. 181–188; V. Vlatkovic, et al., *High-voltage, high-power, ZVS, full-bridge PWM converter employing an active snubber,* Proc. IEEE Applied Power Electronics Conf., March, 1991, pp. 158–163. The aforementioned references are incorporated herein by reference. The presently available active circuits, however, tend to be complex in nature and generally lack the robustness inherent with the use of passive elements.

Accordingly, what is needed in the art is a robust means to reduce the undesirable ringing amplitude in the converter without significantly effecting the efficiency of the converter.

SUMMARY OF THE INVENTION

To address the above-discussed deficiencies of the prior art, the present invention provides, for use with a power converter having a rectifier that receives current from a secondary side of transformer and delivers the current to an output thereof via an output inductor, a low loss clamp for, and method of, attenuating ringing energy in the secondary side. In one embodiment, the clamp includes: (1) an auxiliary transformer coupled across a component in the secondary side and (2) an auxiliary switch, interposed between the auxiliary transformer and the output, that operates as a function of a voltage of the output to cause the auxiliary transformer to receive at least a portion of the ringing energy and deliver the portion to the output.

The present invention therefore introduces the broad concept of capturing, in an auxiliary transformer located across a component (such as the rectifier, the transformer or the output inductor), at least a portion of ringing (AC) energy that may be present in the secondary side of the transformer and directing the captured energy toward or delivering the captured energy to the converter's output. Capturing and delivering the energy in this manner incurs little power loss. In fact, if the auxiliary transformer and auxiliary switch are judiciously chosen, the clamp of the present invention may be considered lossless in practical terms.

In one embodiment of the present invention, the auxiliary switch is a diode biased toward the output. Of course, the present invention may make use of an active switch, such as a bipolar transistor or field-effect transistor (FET), under active control to achieve the desired delivery of ringing energy.

In one embodiment of the present invention, the clamp further includes: (1) a second auxiliary transformer coupled across another component in the secondary side and (2) a second auxiliary switch, interposed between the auxiliary transformer and the output. In one embodiment to be illustrated and described, multiple auxiliary transformers and switches are employed to capture energy from one or more components.

In one embodiment of the present invention, the auxiliary switch further operates to preclude the current from passing from the output through the auxiliary transformer. Thus, the switch may completely block reverse current flow through the clamp.

In one embodiment of the present invention, a primary to secondary turns ratio of the auxiliary transformer is preselected such that a clamping voltage of the auxiliary transformer is lower than a voltage of the ringing energy. In a related embodiment, a primary to secondary turns ratio of the auxiliary transformer is preselected such that a clamping voltage of the auxiliary transformer is higher than a steady state voltage across the component.

In one embodiment of the present invention, the auxiliary transformer (or transformers, as the case may be) is integral with the component in the secondary side. In such cases the auxiliary transformer is integral with the component (the rectifier, the transformer or the output inductor) from which the ringing energy is received. Alternately, the auxiliary transformer can be a discrete component.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
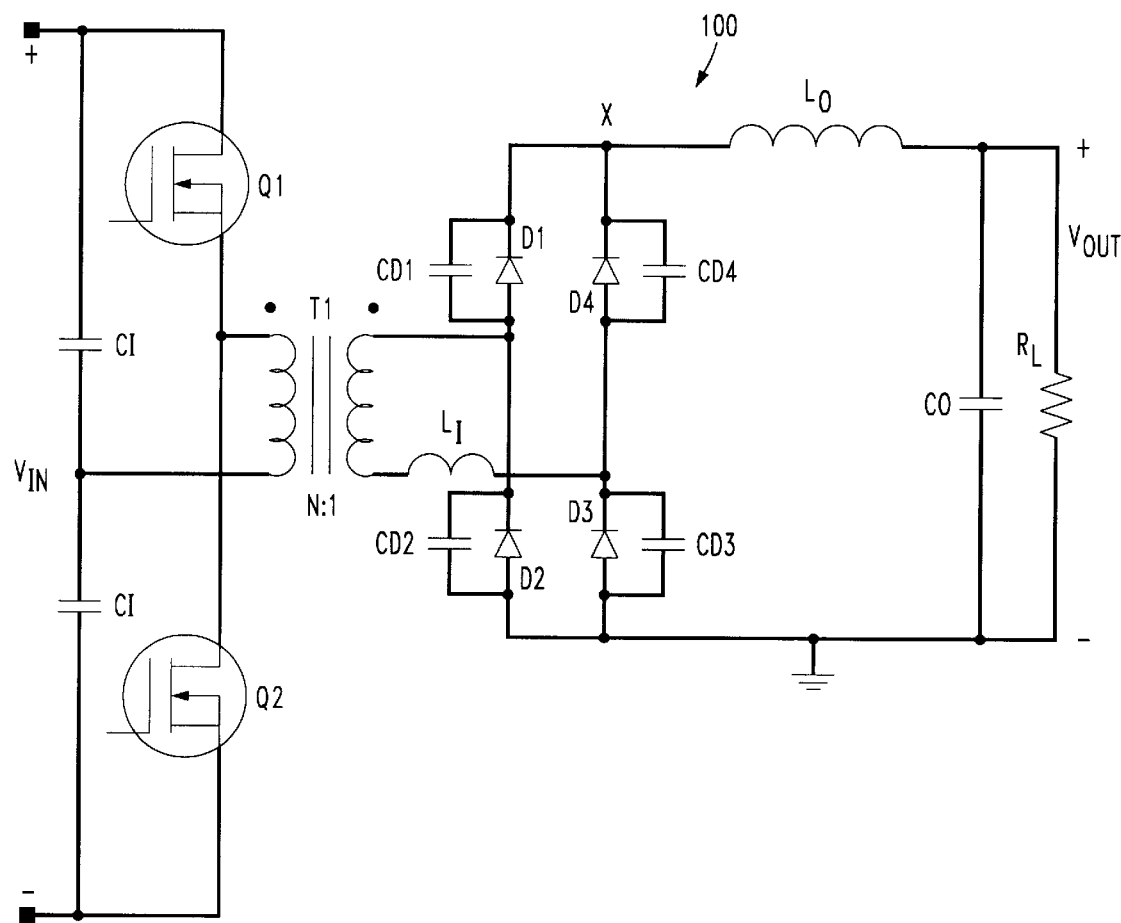
FIG. 1 illustrates a schematic diagram of a power converter providing an environment for the present invention.

Referring initially to FIG. 1, illustrated is a schematic diagram of a power converter (e.g., a DC-DC power converter) 100 providing an environment for the present invention. The converter 100 is a DC-to-DC half-bridge topology including input capacitors C1, C2, switching devices Q1, Q2, transformer T1, transformer leakage inductance L1, first, second, third and fourth rectifier devices D1, D2, D3, D4 and associated rectifier device capacitances CD1, CD2, CD3, CD4, output inductor Lo, output capacitor Co and output load resistance R1. The switching devices Q1, Q2 are alternately driven to conduct with a duty cycle that is controlled from regulating circuits (not shown) that sense and maintain an output voltage, Vout, at its desired value. The duty cycle depends on the ratio of output voltage Vout to an input voltage Vin with larger values of the input voltage Vin dictating shorter "on" times and vice versa. As the switching devices Q1, Q2 alternately conduct, the transformer T1 drives the first and third rectifier devices D1, D3 and the second and fourth rectifier devices D2, D4 alternately to conduct thereby transmitting power to the output of the converter 100. The output inductor Lo and the output capacitor Co are filter elements that provide a constant output voltage Vout.

As previously described, the maximum reverse-bias voltage (MRBV) that the rectifier devices D1, D2, D3, D4 encounter is a critical parameter affecting both converter 100 cost and efficiency considerations. In an idealized case, the MRBV equals the output voltage Vout divided by the "duty-ratio" (a parameter less than one and designated by the letter D) of the switching devices Q1, Q2. Therefore, MRBV=Vout/D in the idealized case.

Figure 2A:
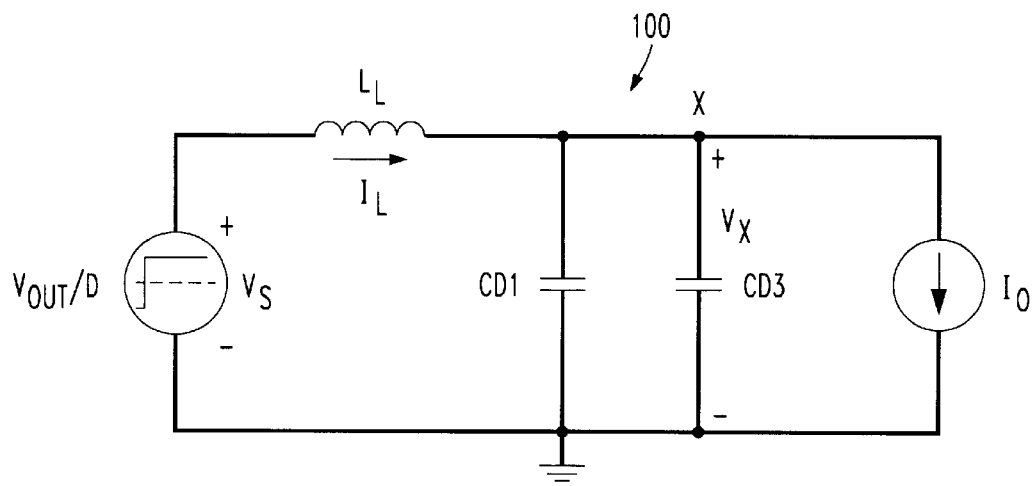
FIG. 2A illustrates a simplified schematic diagram of the power converter of FIG. 1.

Turning now to FIG. 2A, illustrated is a simplified schematic diagram of the converter 100 of FIG. 1 showing, in particular, the transformer leakage inductance L1 and the first and third rectifier device capacitances CD1, CD3. This is an equivalent circuit diagram for the period of time when one rectifier pair (e.g., the first and third rectifier D1, D3) is turning off, the other rectifier pair (e.g., the first and third rectifier D1, D3) is turning on and all rectifiers D1, D2, D3, D4 are conducting as the load current Io commutates from one diagonal pair to the other. As soon as the current drops to zero in the first and third rectifiers D1, D3, the reflected primary transformer voltage drives a resonance between the transformer leakage inductance L1 and the parallel combination of the rectifier capacitances CD1, CD3. As a result, a ringing voltage whose peak value equals 2Vout/D or twice the value of the idealized case is produced.

Figure 2B:
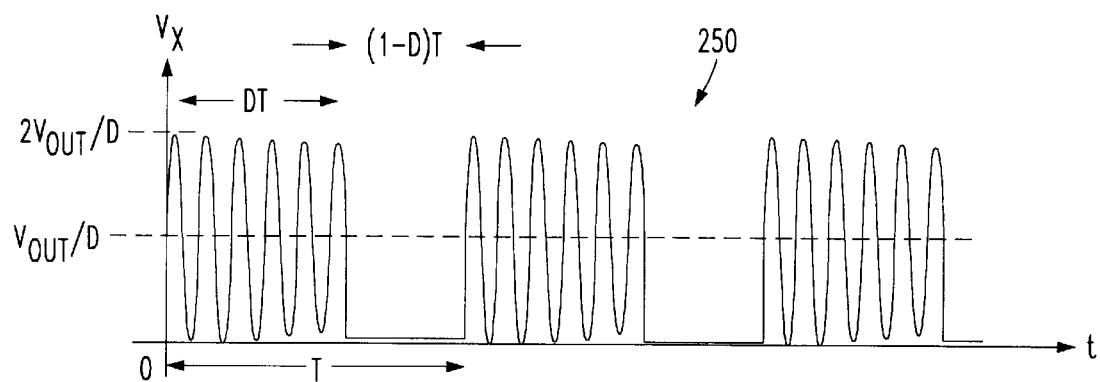
FIG. 2B illustrates a voltage waveform present in the power converter of FIG. 1 at a node X.

Turning now to FIG. 2B, illustrated is a voltage waveform 250 present in the power converter 100 of FIG. 1. More specifically, the voltage waveform 250 demonstrates a waveform at node X during a period DT when one rectifier pair (e.g., the first and third rectifier D1, D3) is conducting and during a period (1-D)T when both rectifier pairs (the first and third rectifier D1, D3 and the second and fourth rectifier D2, D4) are conducting. A ringing voltage whose peak value equals 2Vout/D is demonstrated during the period DT when the first and third rectifiers D1, D3 are conducting.

Figure 3:
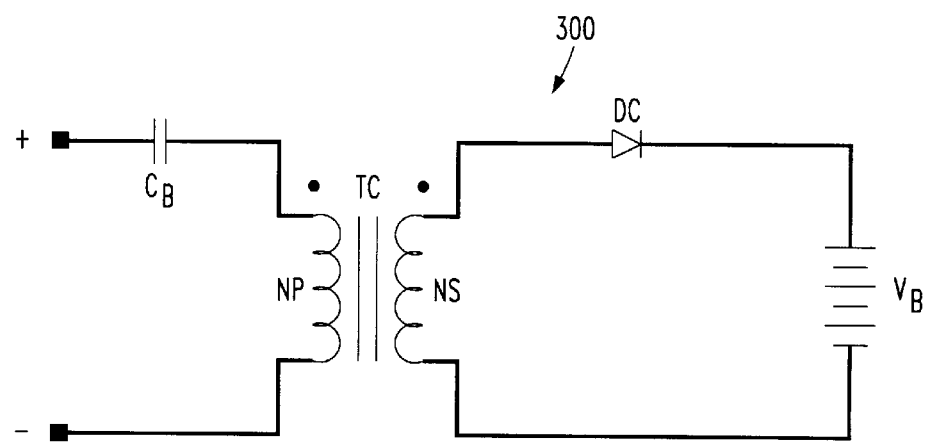
FIG. 3 illustrates an embodiment of a clamp circuit constructed according to the principles of the present invention.

Turning now to FIG. 3, illustrated is an embodiment of a clamp circuit 300 constructed according to the principles of the present invention. The clamp (e.g., a voltage clamp) 300 includes an auxiliary transformer TC, an auxiliary switch (e.g., a diode) DC and is coupled to a low internal impedance voltage source VB. One side of the secondary of the auxiliary transformer TC is connected to the anode of diode DC and the cathode of diode DC is connected to the positive terminal of the voltage source VB. The negative voltage terminal of voltage source VB is connected to the other side of the secondary of the auxiliary transformer TC.

To use this clamp, the primary terminals of the auxiliary transformer TC, are connected across a section of a circuit (for instance, an output inductor of a converter) whose transient voltages are to be limited. Any voltage connected directly across the primary of the auxiliary transformer TC, should have essentially an AC voltage component only and an insignificant DC component, since a substantial DC voltage component will cause the auxiliary transformer TC to saturate and become ineffective. A blocking capacitor Cb may be placed in series with one side of the primary of the auxiliary transformer TC, if necessary.

The primary to secondary turns ratio Np/Ns of the auxiliary transformer TC, should be chosen such that the primary transformer voltage, reflected across the secondary when the diode DC conducts (that is, the clamping voltage) is lower than the transient or ringing voltage to be attenuated but higher than any steady state voltage that normally exists across the primary terminals.

The clamping circuit 300 is passive and therefore more robust than an active circuit. It reduces the voltage stress on, for instance, rectifier diodes of a converter, and improves overall system efficiency of the circuit employing the clamping circuit 300 due to recovery and redirection of the ringing energy into the output load. Further, to achieve component efficiency, the clamping circuit 300 may be integrated with other appropriate magnetic circuit devices, requiring only an external switch to achieve clamping operation.

Figure 4A:
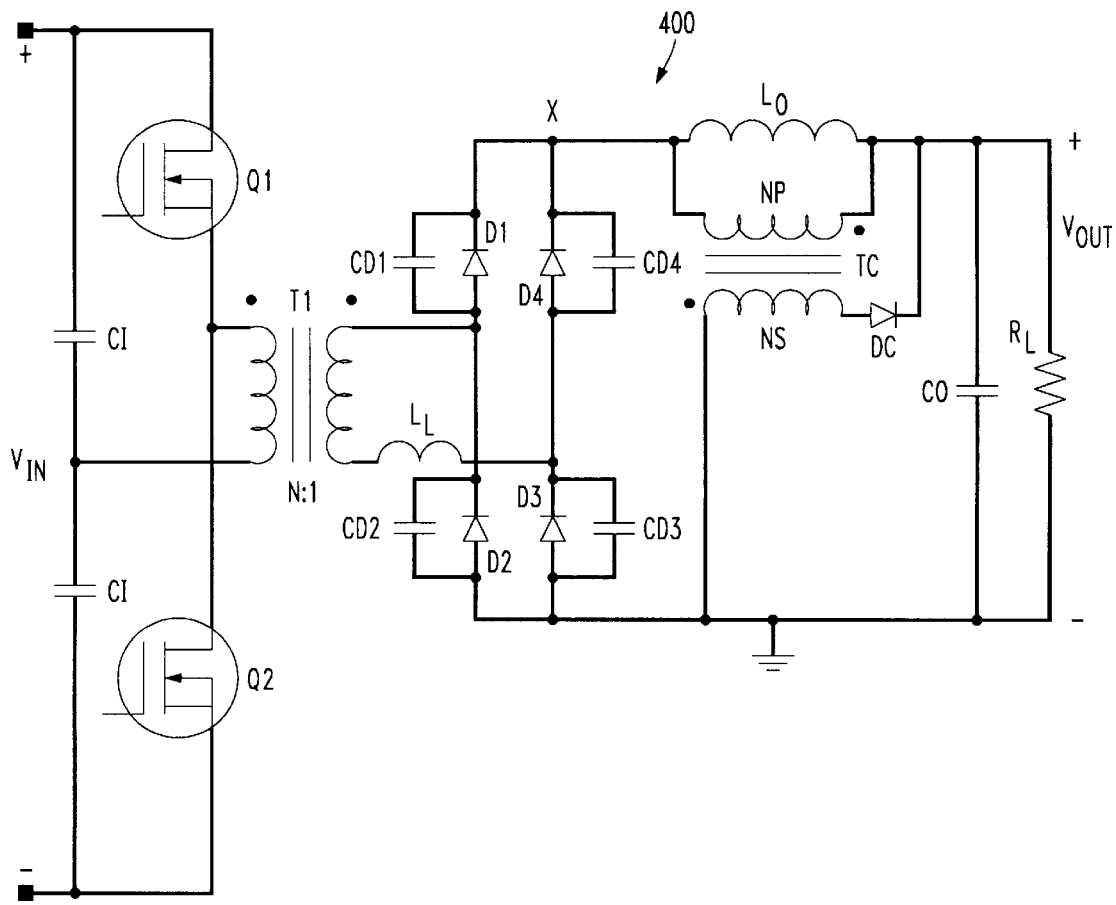
FIG. 4A illustrates a power converter employing a clamp circuit constructed according to the principles of the present invention coupled across an output inductor.

Turning now to FIG. 4A, illustrated is a schematic diagram of a power converter (e.g., a DC-DC converter) 400 constructed according to the principles of the present invention. The converter 400 includes a low loss clamp having an auxiliary transformer TC and auxiliary switch (e.g., a diode) DC. In this embodiment, the primary input terminals of a low loss clamp are positioned across an output inductor Lo and the clamp's output terminals are placed across the output of the converter 400. As discussed earlier, the clamping voltage supplied by the primary of an auxiliary transformer TC, is selected to be slightly greater than the steady state voltage that exists across the output inductor Lo. By making the clamping voltage only slightly greater than the steady state voltage, maximum recovery of the spurious ringing energy occurs. This redirected energy is applied to the output of converter 400, providing increased overall efficiency by recovering energy that would otherwise be lost in conventional methods to control voltage ringing as discussed above.

Figure 4B:
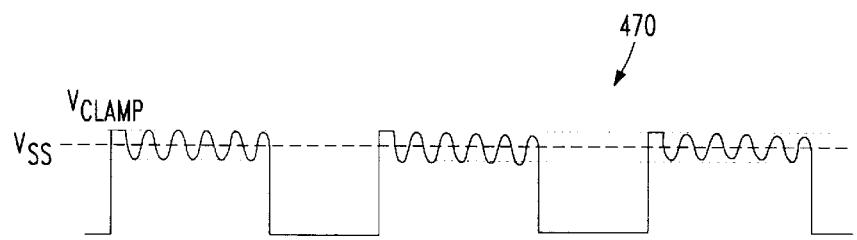
FIG. 4B illustrates a voltage waveform present in the power converter of FIG. 4A at a node X.

Turning now to FIG. 4B, illustrated a voltage waveform 470 present in the power converter 400 of FIG. 4A. As discussed earlier with respect to FIG. 2B, the peak unclamped value of the ringing voltage at node X is 2Vout/D and the steady state voltage would be Vout/D if there was no ringing voltage. The clamp-reduced ringing waveform 470 with respect to the converter 400 shows that the peak ringing voltage at node X has been reduced to the value dictated by the primary transformer clamping voltage $V_{CLAMP}$.

At the instant ringing begins, the leakage inductor current is equal to the output current Io. This current increases until the ringing voltage at node X reaches the value of the clamping voltage $V_{CLAMP}$ where it limits and cannot increase farther. At this point the leakage inductor current decreases until it again reaches the value of the output current Io, where ringing again ensues but at the greatly reduced peak amplitude of $V_{CLAMP}$-Vout/D. The amplitude and energy of this resonance are much smaller than the original unclamped ringing and therefore afford a superior environment for critical circuit components.

Limiting the voltage by clamping across the output inductor Lo causes the ringing waveform to be attenuated across the rectifier diodes D1, D2, D3, D4 as well. Basically, application of the low loss clamp across the output inductor Lo causes the "stiffness" or low impedance of the output of the converter 400 to be reflected so that this low impedance stiffness characteristic is applied across the output inductor Lo. This means that the ringing environment of the rectifier diodes D1, D2, D3, D4 is then also highly damped since the rectifier diodes D1, D2, D3, D4 is driving these two circuit structures and rectifier diodes D1, D2, D3, D4 ringing is constrained to be no more severe than the greatly reduced waveform as shown in FIG. 4B.

It is desirable to integrate the auxiliary transformer TC with the output inductor Lo. Several design elements should be balanced for overall successful operation. However, it may be necessary to isolate the design problems by using a separate auxiliary transformer TC. Of course, the auxiliary transformer TC may be placed across other components (preferably ones causing the ringing energy) in the secondary side of the transformer T1.

Figure 5:
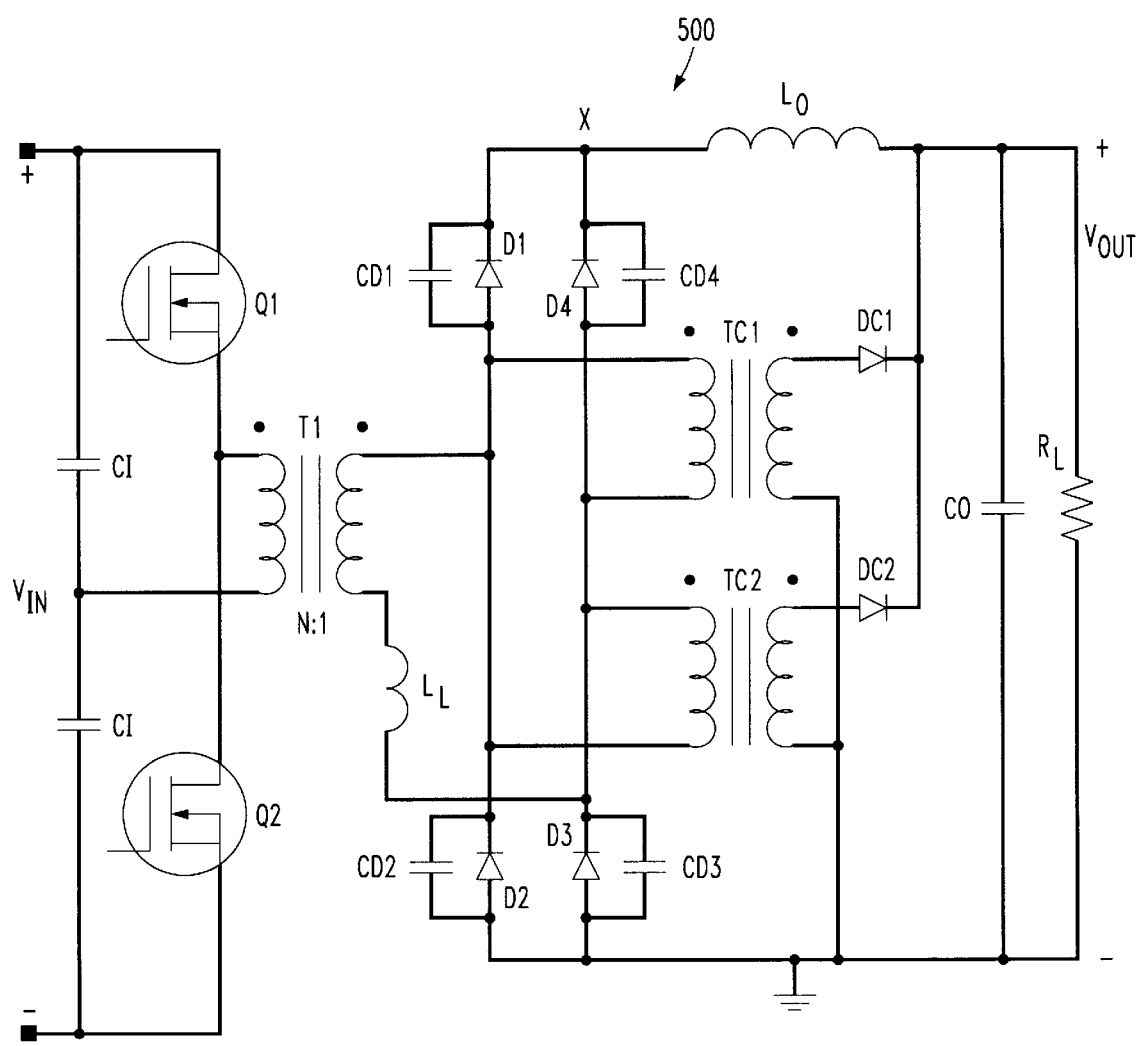
FIG. 5 illustrates another embodiment of a power converter employing a clamp circuit constructed according to the principles of the present invention coupled across a secondary winding of a transformer.

Turning now to FIG. 5, illustrated is another embodiment of a power converter (e.g., a DC-DC half-bridge converter) 500 constructed according to the principles of the present invention. The converter 500 includes a low loss clamp having a first and second auxiliary transformer TC1, TC2 and a first and second auxiliary switch (e.g., a first and second diode) DC1, DC2. The low loss clamp is positioned across a secondary winding of a transformer T1 and rectifier diodes D1, D2, D3, D4 and is connected across a load of the converter 500. The turns ratio of the auxiliary transformers TC1, TC2 should be selected for their primary voltages (the reflected output or clamp voltage) to be between the steady-state and peak ringing transformer voltage. The ringing waveform exhibited by the converter 500 is analogous to the ringing waveform with respect to the converter 400 of FIG. 4 and as illustrated and described with respect to FIG. 4B.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Similarly, although a magnetic device having a single core and a single primary winding has been illustrated, other configurations, such as magnetic devices having multiple primary windings or multiple cores, may be used to accomplish essentially the same results disclosed by the present invention. Additionally, the concepts of the present invention may be employed with other circuit topologies.

For a better understanding of power electronics, power converter topologies, such as bridge-type power converter, and clamping circuits, see: *Principles of Power Electronics*, by J. Kassakian, M. Schlecht, and G. Verghese, Addison-Wesley Publishing Company (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power converter having a rectifier that receives current from a secondary side of transformer and delivers said current to an output thereof via an output inductor, a low loss clamp for attenuating ringing energy in said secondary side, comprising:

an auxiliary transformer having a primary winding coupled across a component in said secondary side; and an auxiliary switch, interposed between a secondary winding of said auxiliary transformer and said output, that operates as a function of a voltage of said output to cause said auxiliary transformer to receive at least a portion of said ringing energy and deliver said portion to said output.

2. The clamp as recited in claim 1 wherein said auxiliary switch is a diode biased toward said output.

3. The clamp as recited in claim 1 further comprising:

a second auxiliary transformer having a primary winding coupled in parallel to said primary winding of said auxiliary transformer; and a second auxiliary switch, interposed between a secondary winding said second auxiliary transformer and said output.

4. The clamp as recited in claim 1 wherein said auxiliary switch further operates to preclude said current from passing from said output through said auxiliary transformer.

5. The clamp as recited in claim 1 wherein a primary to secondary turns ratio of said auxiliary transformer is preselected such that a clamping voltage of said auxiliary transformer is lower than a voltage of said ringing energy.

6. The clamp as recited in claim 1 wherein a primary to secondary turns ratio of said auxiliary transformer is preselected such that a clamping voltage of said auxiliary transformer is higher than a steady state voltage across said component.

7. The clamp as recited in claim 1 wherein said auxiliary transformer is integral with said component.

8. For use with a power converter having a rectifier that receives current from a secondary side of transformer and delivers said current to an output thereof via an output inductor, a method of attenuating ringing energy in said secondary side, comprising the steps of:

receiving at least a portion of said ringing energy into an auxiliary transformer having a primary winding coupled across a component in said secondary side; and delivering said portion to said output via an auxiliary switch interposed between a secondary winding of said auxiliary transformer and said output.

9. The method as recited in claim 8 wherein said auxiliary switch is a diode biased toward said output.

10. The method as recited in claim 8 further comprising the steps of:

receiving at least a second portion of said ringing energy into a primary winding of a second auxiliary transformer coupled in parallel to said primary winding said auxiliary transformer; and delivering said second portion to said output via a second auxiliary switch interposed between a secondary winding of said second auxiliary transformer and said output.

11. The method as recited in claim 8 further comprising the step of further operating said auxiliary switch to preclude said current from passing from said output through said auxiliary transformer.

12. The method as recited in claim 8 wherein a primary to secondary turns ratio of said auxiliary transformer is preselected such that a clamping voltage of said auxiliary transformer is lower than a voltage of said ringing energy.

13. The method as recited in claim 8 wherein a primary to secondary turns ratio of said auxiliary transformer is preselected such that a clamping voltage of said auxiliary transformer is higher than a steady state voltage across said component.

14. The method as recited in claim 8 wherein said auxiliary transformer is integral with said component.

15. A power converter, comprising:

transformer;

a rectifier that receives current from a secondary side of said transformer;

an output inductor that receives said current from said secondary side and delivers said current to an output of said converter; and a low loss clamp for attenuating ringing energy in said secondary side;

an auxiliary transformer having a primary winding coupled across a component in said secondary side, and an auxiliary switch, interposed between a secondary winding of said auxiliary transformer and said output, that operates as a function of a voltage of said output to cause said auxiliary transformer to receive at least a portion of said ringing energy and deliver said portion to said output.

16. The converter as recited in claim 15 wherein said auxiliary switch is a diode biased toward said output.

17. The converter as recited in claim 15 wherein said clamp further includes:

a second auxiliary transformer having a primary winding coupled in parallel to said primary winding of said auxiliary transformer, and a second auxiliary switch, interposed between a secondary winding of said second auxiliary transformer and said output.

18. The converter as recited in claim 15 wherein said auxiliary switch further operates to preclude said current from passing from said output through said auxiliary transformer.

19. The converter as recited in claim 15 wherein a primary to secondary turns ratio of said auxiliary transformer is preselected such that a clamping voltage of said auxiliary transformer is lower than a voltage of said ringing energy.

20. The converter as recited in claim 15 wherein a primary to secondary turns ratio of said auxiliary transformer is preselected such that a clamping voltage of said auxiliary transformer is higher than a steady state voltage across said component.

21. The converter as recited in claim 15 wherein said auxiliary transformer is integral with said component.

* * * * *